US010686820B1

(12) United States Patent
Sheffer et al.

(10) Patent No.: US 10,686,820 B1
(45) Date of Patent: Jun. 16, 2020

(54) SCOPING CYBER-ATTACK INCIDENTS BASED ON SIMILARITIES, ACCESSIBILITY AND NETWORK ACTIVITY

(71) Applicant: SKYBOX SECURITY LTD., Herzliya (IL)

(72) Inventors: Tal Sheffer, Tel Aviv (IL); Ravid Circus, Kfar Saba (IL); Moshe Raab, Sde Varburg (IL); Lior Ben Naon, Nes Ziona (IL); Gideon David Cohen, Palo Alto, CA (US)

(73) Assignee: SKYBOX SECURITY Ltd, Herzliya (IL)

( * ) Notice: Subject to any disclaimer, the term of this patent is extended or adjusted under 35 U.S.C. 154(b) by 132 days.

(21) Appl. No.: 15/635,450

(22) Filed: Jun. 28, 2017

Related U.S. Application Data

(60) Provisional application No. 62/358,016, filed on Jul. 3, 2016.

(51) Int. Cl.
| | |
|---|---|
| *G06F 11/00* | (2006.01) |
| *H04L 29/06* | (2006.01) |
| *G06F 21/55* | (2013.01) |
| *G06F 21/57* | (2013.01) |

(52) U.S. Cl.
CPC ........ *H04L 63/1433* (2013.01); *G06F 21/552* (2013.01); *H04L 63/145* (2013.01); *H04L 63/1425* (2013.01); *G06F 21/57* (2013.01); *H04L 63/1416* (2013.01)

(58) Field of Classification Search
CPC ............. H04L 63/1433; H04L 63/1425; H04L 63/145; H04L 63/1416; G06F 21/552; G06F 21/57
See application file for complete search history.

(56) References Cited

U.S. PATENT DOCUMENTS

| | | | | |
|---|---|---|---|---|
| 2009/0064334 A1* | 3/2009 | Holcomb | ............... | G06F 21/554 726/24 |
| 2009/0217381 A1* | 8/2009 | Helman | ................ | G06F 21/552 726/25 |
| 2010/0125912 A1* | 5/2010 | Greenshpon | .......... | G06F 21/577 726/25 |
| 2012/0143650 A1* | 6/2012 | Crowley | ............... | G06F 21/554 705/7.28 |
| 2014/0090058 A1* | 3/2014 | Ward | .................. | H04L 63/1433 726/23 |
| 2017/0048266 A1* | 2/2017 | Hovor | ................. | H04L 63/1433 |

* cited by examiner

*Primary Examiner* — Baotran N To
(74) *Attorney, Agent, or Firm* — Reches Patents

(57) ABSTRACT

A method for evaluating a scope of cyber-attack incidents, the method may include detecting original compromised assets and malicious external machines that are related to each of the cyber-attack incidents; classifying potentially compromised assets to different classes based on (a) similarities between the potentially compromised assets and the original compromised assets, (b) a level of accessibility from the original compromised assets and malicious external machines to the potentially compromised assets, and (c) volumes of traffic between the potentially compromised assets and each one of the malicious external machines and the original compromised assets; wherein the different classes comprise compromised and non-compromised; and generating an alert that is indicative of the compromised assets and of potentially compromised assets that were classified as compromised.

24 Claims, 8 Drawing Sheets

SCOPING CYBER-ATTACK INCIDENTS BASED ON SIMILARITIES, ACCESSIBILITY AND NETWORK ACTIVITY

CROSS REFERENCE

This application claims priority from US provisional patent 62/358,016 filing date Jul. 3, 2016.

BACKGROUND

One of the biggest challenges that incident response teams face today is determining the scope of the cyber-attack incidents that they investigate. While software vendors and security experts have made a concentrated effort on detecting cyber-attacks (by correlating event logs, finding abnormal behavior patterns, etc.) very little effort was made to solve the problem of incident scoping. And so, in many cases, even when a cyber-attack is detected, it is handled without proper understanding of its dimensions, scope, goals and context. As a result, remediation operations are often partial and end without an actual effect: the attackers are still in the victims' network; attack operations resume, more or less, as planned; and the victims are left with a false sense of security, as they tend to believe that the incident has been stopped. In some cases, partial remediation does more harm than good, as attackers realize that they have been spotted, and—as a result—alter/improve their attack methods or rapidly exfiltrate the data that they have collected.

SUMMARY

There may be provided a method for evaluating a scope of cyber-attack incidents, the method may include detecting original compromised assets and malicious external machines that may be related to each of the cyber-attack incidents; classifying potentially compromised assets to different classes based on (a) similarities between the potentially compromised assets and the original compromised assets, (b) a level of accessibility from the original compromised assets and malicious external machines to the potentially compromised assets, and (c) volumes of traffic between the potentially compromised assets and each one of the malicious external machines and the original compromised assets; wherein the different classes may include compromised and non-compromised; and generating an alert that may be indicative of the compromised assets and of potentially compromised assets that were classified as compromised.

The different classes may include a suspected asset that warrants further analysis.

The classifying of the potentially assets may include assigning a compromise score to each potentially compromised asset, wherein a compromise score of a given potentially compromised asset may be responsive to (a) similarities between the given potentially compromised asset and each one of the original compromised assets, (b) a level of accessibility from the original compromised assets and malicious external machines to the given potentially compromised assets, and (c) a volume of traffic between the given potentially compromised asset and each one of the malicious external machines and the original compromised assets.

The calculating of the compromise score of the given potentially compromised asset may include calculating a similarity score that may be based on weighted similarity values.

The calculating of the compromise score of the given potentially compromised asset may be further based on upper bounds of the weighted similarity values.

The method may include calculating the weighted similarity values by multiplying similarity values that represent similarities between different parameters of the given potentially compromised asset and the compromised assets by weights.

The method may include assigning a more significant weight to similarity of indicator of compromise than to an operating system similarity.

The different parameters may include at least two out of an operating system, an operating system family, a common vulnerability, an indicator of compromise and malware instance.

The different parameters may include an operating system, an operating system family, a common vulnerability, an indicator of compromise and malware instance.

The calculating of the compromise score of the given potentially compromised asset may include calculating a similarity score that may be responsive to a number of compromised assets that may be deemed to be similar to the given potentially compromised asset.

The method may include calculating the accessibility of the given potentially compromised asset from each one of the original compromised assets and malicious external machines based on a number of ports of the given potentially compromised asset that may be accessible to each one of the compromised assets and malicious external machines.

The method may include classifying each potentially compromised asset to different classes that may include compromised, non-compromised and a suspected asset that warrants further analysis based on the compromise score of each potentially compromised asset.

There may be provided a non-transitory computer readable medium that stores instructions that once executed by a computer causes the computer to evaluate a scope of cyber-attack incidents, by detecting original compromised assets and malicious external machines that may be related to each of the cyber-attack incidents; classifying potentially compromised assets to different classes based on (a) similarities between the potentially compromised assets and the original compromised assets, (b) a level of accessibility from the original compromised assets and malicious external machines to the potentially compromised assets, and (c) volumes of traffic between the potentially compromised assets and each one of the malicious external machines and the original compromised assets; wherein the different classes may include compromised and non-compromised; and generating an alert that may be indicative of the compromised assets and of potentially compromised assets that were classified as compromised.

The different classes may include a suspected asset that warrants further analysis.

The classifying of the potentially assets may include assigning a compromise score to each potentially compromised asset, wherein a compromise score of a given potentially compromised asset may be responsive to (a) similarities between the given potentially compromised asset and each one of the original compromised assets, (b) a level of accessibility from the original compromised assets and malicious external machines to the given potentially compromised assets, and (c) a volume of traffic between the given potentially compromised asset and each one of the malicious external machines and the original compromised assets.

The calculating of the compromise score of the given potentially compromised asset may include calculating a similarity score that may be based on weighted similarity values.

The calculating of the compromise score of the given potentially compromised asset may be further based on upper bounds of the weighted similarity values.

The non-transitory computer readable medium may store instructions for calculating the weighted similarity values by multiplying similarity values that represent similarities between different parameters of the given potentially compromised asset and the compromised assets by weights.

The non-transitory computer readable medium may store instructions for assigning a more significant weight to similarity of indicator of compromise than to an operating system similarity.

The different parameters may include at least two out of an operating system, an operating system family, a common vulnerability, an indicator of compromise and malware instance.

The different parameters may include an operating system, an operating system family, a common vulnerability, an indicator of compromise and malware instance.

The calculating of the compromise score of the given potentially compromised asset may include calculating a similarity score that may be responsive to a number of compromised assets that may be deemed to be similar to the given potentially compromised asset.

The non-transitory computer readable medium may store instructions for calculating the accessibility of the given potentially compromised asset from each one of the original compromised assets and malicious external machines based on a number of ports of the given potentially compromised asset that may be accessible to each one of the compromised assets and malicious external machines.

The non-transitory computer readable medium may store instructions for classifying each potentially compromised asset to different classes that may include compromised, non-compromised and a suspected asset that warrants further analysis based on the compromise score of each potentially compromised asset.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
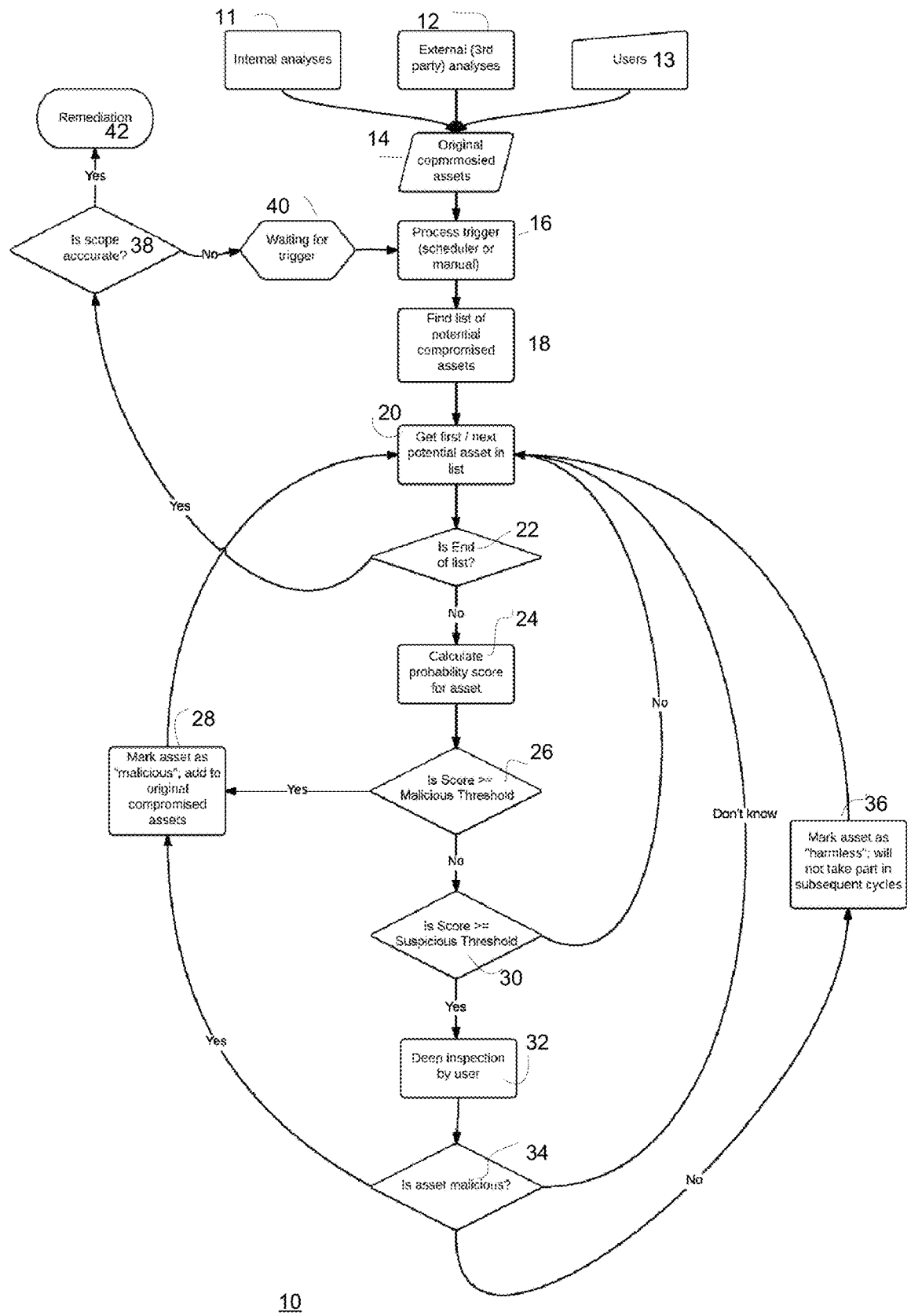
FIG. 1 illustrates a method according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

There is provided a method, system and non-transitory computer medium that stores instructions of scoping cyber-attack incidents in large-scale network environments, comprising: (a) identifying additional potential compromised assets ("candidates") based on their similarity to assets that are already marked as "compromised" ("original compromised assets"); (b) identifying candidates based on their accessibility from the incident's malicious machines (original compromised assets and external machines that are associated with the incidents); (c) identifying candidates based on network activity (between these candidates and the incident's external machines; (d) prioritizing the candidates by assigning them a probability score, based on the criteria stated above; (e) providing a mechanism that allows users to manage the scoping process, by associating (or dissociating) compromised assets to cyber-attack incidents.

There is provided a mechanism that helps response teams with incident scoping, by quickly identifying assets that are more likely to be compromised by the threat actors responsible for the investigated cyber-attack.

The terms "network activity" and "traffic" are used in an interchangeable manner and may refer to inbound and/or outbound traffic (or network activity).

Definitions

The following definitions may be used in this specification:

Cyber-attack Incident/Investigated Incident: A single attack campaign, typically conducted by a single threat actor in order to achieve a certain goal (e.g. money, personally identifiable information).

Asset—may be a single machine, a desktop, a laptop, a server, a device, a mobile device, which is connected to the network and is owned and managed by the victim organization. Each asset can be marked as "malicious" (compromised), "suspicious" (suspicious as compromised) or "harmless" (not compromised).

External Machine: A single machine, a desktop, a laptop, server, a device, a mobile device which is not owned and managed by the victim organization. Each external machine can be marked as "malicious" (compromised), "suspicious" (suspicious as compromised) or "harmless" (not compromised). Malicious external machines can initiate attacks on the victim organization or function as command-and-control servers for malware that is already installed on the victim organization's assets.

Scoping Process: A process that expands the amount of assets associated with an investigated incident. The process consists of one or more iterative cycles.

Original Compromised Assets: The assets that are associated with the investigated incident before a certain cycle of the scoping process begins.

Potential Compromised Assets/Candidates: The assets that are being analyzed in a certain cycle of the scoping process, which are considered as new candidates for association with the investigated incident. These are typically all the assets that are not already associated with the investigated incident, excluding the assets that are marked as "harmless".

Incident's Malicious Machines: All the malicious machines that are related to an incident, including the original compromised assets and external machines that relate to that incident (command-and-control servers and machines that directly attack assets, trying to exploit their vulnerabilities).

Similarity: One of the three methods, which identify and prioritize potential compromised assets. The more a candidate is similar to the original compromised assets, the more probable it is that this candidate is compromised. In the example given below, similarity is calculated based on factors that relate to the following dimensions:
  a. OS (Operating System) Family: The type of operating system installed on a certain asset (e.g. "Windows", "Linux", "Unix", "MacOS").
  b. OS (Operating System) Product: The specific operating system product that is installed on a certain asset (e.g. "Windows XP", "Windows 8.1").
  c. Service: A product or module of software installed on a certain asset (e.g. "Microsoft IIS", "Unknown DNS service").
  d. Vulnerability: A weakness found in one of the services installed on a certain asset, which may be abused by exploits in order to propagate malware and viruses.
    CVSS (Common Vulnerability Scoring System) Score: A severity score attached to each vulnerability. The scale of the score is between 0-10, with 10 being the most severe (https://www.first.org/cvss).
  e. IOC (Indicator of Compromise): Any indication that a certain asset has been compromised by malware, virus or any other method (e.g. suspicious file, registry entry, unfamiliar process or outbound communication to a suspicious external machine). In the example given below, each IOC has a certainty level attribute with a scale that ranges from "very high" to "very low".
  f. Malware Instance: An assumption that malicious software (e.g. "Lurk", "Cerber", "Alina") is installed and running on a certain asset. Such an assumption can be a result of an analysis done by a $3^{rd}$ party product (Symantec's SEP or equivalent) or by Skybox (based, among other factors, on the IOCs that were found on the asset). In the example given below, each malware instance has a certainty level attribute with two optional values: "malicious" (malware existence is certain) and "suspicious" (malware existence is not certain).

Accessibility: Accessibility, which is the potential access level between assets, is the second method that identifies and prioritizes potential compromised assets. The more a candidate is accessible from the incident's malicious machines, the more probable it is that this candidate is compromised. Calculating the accessibility level is done using Skybox's Access Analyzer. In the example given below, there are five levels of accessibility between assets:
  a. Full Access
  b. Promiscuous Access
  c. Standard Access
  d. Limited Access
  e. No Access Network Activity: Network Activity is the third method that identifies and prioritizes potential compromised assets. The more network activity (inbound and/or outbound) is found between a candidate and the incident's external machines, the more probable it is that this candidate is compromised. Network activity is collected from a variety of sources, including Firewalls, Intrusion Prevention Systems, End Protection platforms and Log Aggregators (Splunk or equivalent). In the example given below, there are four levels of network activity between an asset and an external machine:
  a. High Network Activity
  b. Medium Network Activity
  c. Low Network Activity
  d. No Network Activity Process 10 of FIG. 1.

Each cycle of the scoping process starts with existing compromised assets that are already associated with the investigated incident ("original compromised assets"). This association (14) is a result of one of the following: (a) analyses (step 11) done by other features of Skybox's platform; (b) analyses (step 12) done by $3^{rd}$ party products; (c) data (13) that was entered manually by users; (d) compromised assets (step 28) that were added in previous cycles of the scoping process.

Each cycle of the scoping process may be triggered (step 16): (a) by a scheduler (e.g. every day at a certain time); (b) by a user request; (c) based on an external event (e.g. a new incident that was detected on certain assets).

Each cycle may include the following steps:

a. Identifying (step 18) new assets that are potentially compromised ("potential compromised assets/candidates").
b. Getting the first or next potential asset in the list (step 20). If it is the end of the list (step 22) then jumping to step 38 of checking if the scope is accurate.
c. Calculating (step 24) a score for each candidate ("probability score"). The probability score takes into account: (a) the similarity of the candidate to the original compromised assets; (b) the accessibility of this candidate from the incident's malicious machines; (c) the network activity (inbound/outbound) between this candidate and the incident's external machines. An example of such probability score calculation is presented below.
d. Automatically adding (query step 26—when positive answer—step 28) all candidates whose probability score surpasses a certain threshold ("malicious asset threshold") to the incident's compromised asset list. These assets will be considered as original compromised assets in subsequent cycles of the process.
e. Presenting all the candidates whose probability score surpasses a certain threshold ("suspicious asset threshold") to the users (query step 30—if yes—jumping to step 32—may warrant deep inspection by user—step 32).
f. Allowing the users to conduct a deep inspection (step 32) of each suspicious asset—via internal and/or external (3rd party) tools and to determine whether it is malicious or harmless.
   If determined as "malicious" (query step 34), the candidate will be considered as an original compromised asset in subsequent cycles of the process (step 28).
   If determined as "harmless" (query step 34—if harmless jump to step 36), the candidate will remain out of the game in subsequent cycles of the process. A "harmless" tag will expire in one of the following cases: (a) a major change to the asset's attributes (e.g. operating system version was updated) (b) a certain period of time passes.
   In all other cases, the candidate will remain suspicious and continue to be considered as a candidate in subsequent cycles of the process.

After every cycle of the scoping process, the users can evaluate (step 38) whether the scope of the incident is accurate enough. Is so—they can proceed to efficient, successful remediation procedures (step 42). Else—the method may jump to step 40 of waiting for a trigger for a new loop—and once receiving a trigger jumping to step 16.

Example: Probability Score Calculation

The following description is a non-limiting example of a formula for calculating probability score based on similarity, accessibility and network activity. In this example, the score is calculated in nine steps:
a. A similarity score is calculated for each combination of "original asset—candidate" pair.
b. The maximal similarity score of all the combinations that relate to a certain candidate becomes this candidate's similarity score.
c. A bonus factor is granted to each candidate that relates to many pairs with high similarity score.
d. An accessibility level is calculated for each combination of "incident malicious machine—candidate" pair.
e. The maximal accessibility level of all the combinations that relate to a certain candidate determines the accessibility factor of this candidate.
f. The level of network activity between each candidate and the incident's external machines determines the candidate's network activity factor.
g. The probability score for each candidate is determined by multiplying the candidate's similarity score by its bonus factor, by its accessibility factor and by its network activity factor.
h. All the candidates with a score that surpasses the malicious asset threshold are marked as malicious.
i. All the candidates with a score that surpasses the suspicious asset threshold are presented to the users, who can determine whether these assets are malicious or harmless.

Step 1: Similarity Score for each Combination of "Original Compromised Asset—Candidate" Pair Each combination of original compromised asset—candidate pair gets a score, based on the similarity between the two assets.

In this example, the score is calculated in the following manner:
a. All the similarity factors that are relevant to the pair are identified (e.g. similar vulnerabilities, similar IOCs). A list of suggested similarity factors and their default attributes is described in Table 1.
b. For each factor, a sort-order value is calculated by multiplying the factor's weight with its upper bound (W*UB). For suggested default values for each factor, see Table 1.
c. The factors are then sorted based on their sort-order value (from highest to lowest).
d. Each factor increments the score in the following manner:
$S2 = ((UB-S1)>0)?S1+((UB-S1)*W): S1$.
S1—Score before the factor's effect
S2—Score after the factor's effect
W—Factor's weight
UB—Factor's upper bound In the current example, these are the suggested similarity factors and their default attributes: W stands for default weight and UB stands for default upper bound

TABLE 1

Similarity factors, their default attributes and potential discovery methods

| Similarity Factor | W | UB | Potential Discovery Methods |
|---|---|---|---|
| Each similar Malware Instance - malicious (certain) | 0.7 | 1 | End Point Protection platforms (Symantec SEP or equivalent), deducted from IOCs by Skybox |
| Each similar Malware Instance - suspicious (not certain) | 0.6 | 0.9 | |
| Each similar IOC - Very high certainty | 0.7 | 1 | EDR (Endpoint Detection & Response) products (Symantec ATP or equivalent), |
| Each similar IOC - High certainty | 0.6 | 0.9 | Remote scan via WMI or PowerShell |
| Each similar IOC - Medium certainty | 0.3 | 0.8 | |
| Each similar IOC - Low certainty | 0 | — | |
| Each similar IOC - very low certainty | 0 | — | |
| Each Similar Vulnerability | CVSS Score *0.05 | 0.8 | Vulnerability scanners (Rapid7 Nexpose or equivalent), deducted by Skybox's Vulnerability Detector (previously known as Virtual Scan) |

TABLE 1-continued

Similarity factors, their default attributes and potential discovery methods

| Similarity Factor | W | UB | Potential Discovery Methods |
|---|---|---|---|
| 4 (or more) similar services | 0.6 | 0.7 | Banner analysis, Asset Management services (Microsoft SCCM or equivalent), |
| 3 similar services | 0.4 | 0.6 | Vulnerability scanners (Rapid7 Nexpose or equivalent) |
| 2 similar services or less | 0 | — | |
| Similar OS (product) | 0.4 | 0.7 | Banner analysis, Asset Management services (Microsoft SCCM or equivalent), |
| Similar OS (family) | 0.3 | 0.5 | Active Directory, Vulnerability scanners (Rapid7 Nexpose or equivalent), End Point Protection platforms (Symantec SEP or equivalent) |

Similarity score calculation examples:
a. A pair with the following similarities: (a) 1 similar IOC with high certainty level; (b) 1 similar vulnerability with CVSS score of 10; (c) 1 similar vulnerability with CVSS score of 8; (d) 4 similar services; (e) similar OS product.

TABLE 2.1

Example of calculating similarity to a pair of assets

| Factor | S1 | W | UB | SORT = UB − W * UB S1 | (UB − S1) * W | S2 |
|---|---|---|---|---|---|---|
| IOC - High certainty | 0 | 0.6 | 0.9 | 0.54 | 0.9 | 0.54 | 0.54 |
| 4 similar services | 0.54 | 0.6 | 0.7 | 0.42 | 0.16 | 0.096 | 0.636 |
| Vulnerability - CVSS 10 | 0.636 | 0.05 * 10 = 0.5 | 0.8 | 0.4 | 0.164 | 0.082 | 0.718 |
| Vulnerability - CVSS 8 | 0.718 | 0.05 * 8 = 0.4 | 0.8 | 0.32 | 0.082 | 0.0328 | 0.7508 |
| Similar OS (product) | 0.7508 | 0.4 | 0.7 | 0.28 | <0 | 0 | 0.7508 | b. A pair with the following similarities: (a) 2 similar vulnerabilities with CVSS score of 8; (b) 4 similar services; (c) similar OS family.

TABLE 2.2

Example of calculating similarity to a pair of assets

| Factor | S1 | W | UB | SORT = UB − W * UB S1 | (UB − S1) * W | S2 |
|---|---|---|---|---|---|---|
| 4 similar services | 0 | 0.6 | 0.7 | 0.42 | 0.7 | 0.42 | 0.42 |
| Vulnerability - CVSS 8 | 0.42 | 0.05 * 8 = 0.4 | 0.8 | 0.32 | 0.38 | 0.152 | 0.572 |
| Vulnerability - CVSS 8 | 0.572 | 0.05 * 8 = 0.4 | 0.8 | 0.32 | 0.228 | 0.0912 | 0.6632 |
| Similar OS (family) | 0.6632 | 0.3 | 0.5 | 0.15 | <0 | 0 | 0.6632 |

Step 2: Similarity Score for Each Candidate

In the current example, the similarity score of each candidate is determined by the maximal value of the similarity score of all the pairs that relate to this candidate.

$$SS(c) = MAX(SS(c,o1), SS(c,o2), \ldots, SS(c,on))$$

SS—Similarity score
c—candidate
o—original asset

Step 3: Bonus Factor for Each Candidate with Many Pairs with High Similarity Score In the current example, a bonus factor is given to each candidate that relates to "many" pairs with "high" similarity score (it is similar to many original assets).

The "Many" threshold is determined by multiplying the amount of original compromised assets by the "many" factor.
a. The default value of the "many" factor is 0.75
b. "Many" threshold examples:
   1. In a scoping cycle that starts with 20 original compromised assets, 15 pairs (or more) are considered as "many".
   2. In a scoping cycle that starts with 100 original compromised assets, 75 pairs are considered as "many".

The "High" threshold is determined by multiplying the similarity score granted to the best candidate in the cycle by the "high" factor.
a. The default value of the "high" factor is 0.75.
b. The minimal value of "high" threshold is 0.5.
c. "High" threshold examples:
   1. In a scoping cycle that grants a score of 0.9 to the best candidate, all the pairs that get a score of 0.675 are considered as pairs with "high" score.
   2. In a scoping cycle that grants a score of 0.7 to the best candidate, all the pairs that get a score of 0.525 are considered as pairs with "high" score.
   3. In a scoping cycle that grants a score of 0.55 to the best candidate, all the pairs that get a score of 0.5 are considered as pairs with "high" score.

Each candidate that relates to "many" pairs with "high" similarity score is eligible for a bonus factor.
a. The default bonus factor is 1.1

Step 4: Accessibility Level for Each Combination of "Incident's Malicious Machine—Candidate" Pair Next, the accessibility level is calculated for each combination of incident's malicious machine—candidate pair. The incident's malicious machines include all the original compromised assets and the external machines that are associated with the investigated incident.

The accessibility level for each pair is calculated by analyzing the potential access from the pair's source (incident's malicious machine) to the pair's target (candidate). This can be done by using Skybox's Access Analyzer.

In our example, the accessibility level is determined by the amount of target ports that is accessible from the source. The following list suggests accessibility levels and their default attributes:

TABLE 3

Accessibility levels and their default attributes

| Accessibility Level | Access Analysis Result | Default Factor |
|---|---|---|
| Full Access | The source has full access to the destination without any filtering device in the way. | 1.2 |
| Promiscuous Access | The source can access more than 20 ports of the destination. | 1.1 |
| Standard Access | The source can access 6-20 ports of the destination. | 1 |
| Limited Access | The source can access 1-5 ports of the destination. | 0.9 |
| No Access | The source cannot access the destination. | 0.8 |

Step 5: Accessibility Factor for Each Candidate

In the current example, the accessibility factor of each candidate is determined by the maximal value of all the accessibility factors of the pairs that relate to this candidate.

$$AF(c) = MAX(AF(c,s1), AF(c,s2), \ldots, AF(c,sn))$$

AF—Accessibility factor
c—candidate
s—source (incident's malicious machine)

Step 6: Network Activity Factor for Each Candidate

Next, the network activity factor is calculated for each candidate, based on the amount of network sessions (inbound and outbound combined) the candidate had in the month prior to the calculation with the incident's external machines (the machines that attack servers' vulnerabilities and the machines that act as command and control servers).

In our example, the network activity factor is calculated in the following manner:

TABLE 4

Network activity levels and their default attributes

| Network Activity Level | No. of Sessions in the Month prior to the Calculation | Default Factor |
| --- | --- | --- |
| High Network Activity | 20+ | 1.4 |
| Medium Network Activity | 6-19 | 1.3 |
| Low Network Activity | 1-5 | 1.2 |
| No Network Activity | 0 | 1 |

Step 7: Calculating Probability Score for Each Candidate

The total probability score of each candidate is calculated by multiplying the candidate's similarity score by its bonus factor, by its accessibility factor and by its network activity factor.

The result is then multiplied by a 100 to get a 0-100 score range.

$$PS(c)=(SS(c)*BF(c)*AF(c)*NAF(c)>1)?100:SS(c)*BF(c)*AF(c)*NAF(c)*100$$

PS—Probability score
SS—Similarity score
BF—Bonus factor
AF—Accessibility factor
NAF—Network activity factor
c—candidate Examples for total probability score:
a. A candidate with a similarity score of 0.61, that relates to many pairs with high similarity score, that is located in one of the subnets of one of the original assets (Full Access) and that had 3 outbound sessions to one of the incident's external machines in the month prior to the calculation: 0.61*1.1*1.2*1.2*100=96.62
b. A candidate with a similarity score of 0.91, that does not relate to many pairs with high similarity score, that has Limited Access from the incident's malicious machines (up to 5 ports are accessible from each source), and that has no network activity from/to the incident's external machines: 0.91*1*0.9*1*100=81.9

Step 8: Malicious Asset Threshold

All the candidates whose probability score surpasses (or equals to) the malicious asset threshold, are marked as "malicious" and are automatically associated with the investigated incident. In subsequent cycles of the scoping process, these assets will be considered as "original compromised assets".

In the current example, the default value of the malicious asset threshold is 0.9.

Phase 9: Suspicious Asset Threshold

All the candidates whose probability score surpasses (or equals to) the suspicious asset threshold, are marked as "suspicious" and are presented to the users, sorted by their probability score. The users can then do a deep analysis for each of these assets and manually determine: (a) that the asset is malicious and should be associated with the investigated incident; (b) that the asset is harmless and should be kept out of the game in subsequent cycles of the scoping process; or (c) that the asset should remain suspicious.

In the current example, the default value of the suspicious asset threshold is 0.6.

It should be noted that the mentioned above examples are merely non-limiting example and that other mathematical function and/or other classes and/or parameters may be used.

For example: The number of classes may differ than three. The number of accessibility levels may differ from five. The number of network activity levels may differ from four. The number of similarity parameters may differ from six. The classes and/or the accessibility types and/or the network activity level types and/or the similarity parameters may differ from those listed above. The mathematical functions sued for calculating any of the scores may differ from those illustrated above, and the like.

Figure 2:
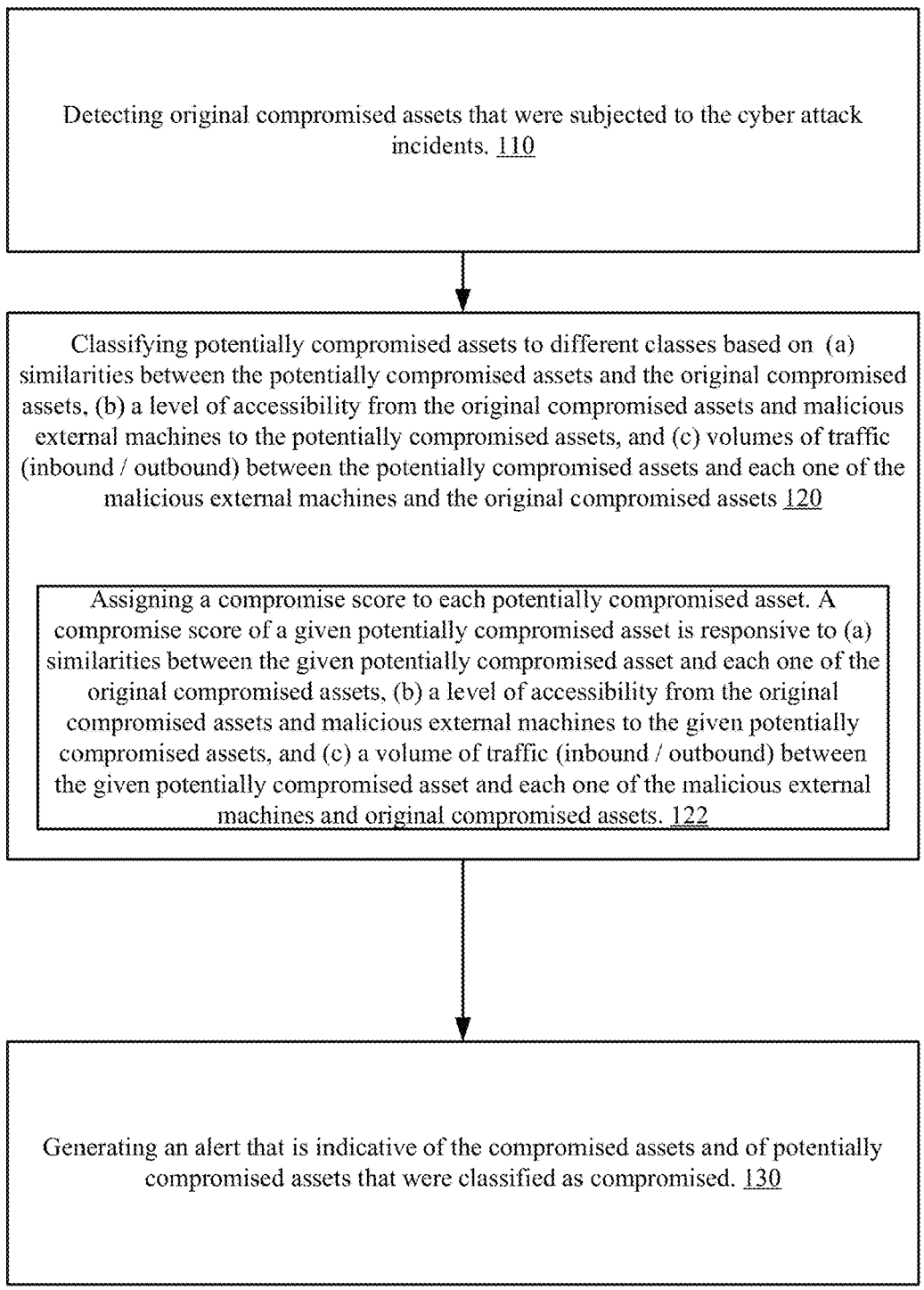
FIG. 2 illustrates a method according to an embodiment of the invention.

FIG. 2 illustrates method 100 according to an embodiment of the invention.

Method 100 is for evaluating a scope of a group of cyber-attack incidents. The group of cyber-attack incidents may include one or more cyber-attack incidents.

Method 100 may start by step 110 of detecting original compromised assets and malicious external machines that are related to each of the cyber-attack incidents. The detecting may include using sensors such as but not limited traffic monitors, firewalls, probes, or any other type of monitors.

A compromised asset may be subjected to one or more cyber-attack incidents.

Step 110 may be triggered in a random manner, in a pseudo-random manner, according to a predefined schedule, according to an occurrence of an event, by a user, by an administrator, automatically and the like.

Step 110 may be followed by step 120 of classifying potentially compromised assets to different classes based on (a) similarities between the potentially compromised assets and the original compromised assets, (b) a level of accessibility from the original compromised assets and malicious external machines to the potentially compromised assets, and (c) volumes of traffic (inbound/outbound) between the potentially compromised assets and each one of the malicious external machines and the original compromised assets.

The different classes may include compromised and non-compromised. The different classes may include one or more other classes such as a suspected asset that warrants further analysis.

Step 120 may include maintaining one or more record of the potentially classifier assets and their class. The one or more record may be one or more file, a classification log, a classification repository and the like.

Step 120 may include step 122 of assigning a compromise score to each potentially compromised asset.

A compromise score of a given potentially compromised asset is responsive to (a) similarities between the given potentially compromised asset and each one of the original compromised assets, (b) a level of accessibility from the original compromised assets and malicious external machines to the given potentially compromised assets, and (c) a volume of traffic (inbound/outbound) between the given potentially compromised asset and each one of the malicious external machines and original compromised assets.

The compromise score of the given potentially compromised asset may include calculating a similarity score that is based on weighted similarity values. See, for example, tables 1,2.1 and 2.2.

The compromise score of the given potentially compromised asset may be also based on upper bounds of the weighted similarity values. See, for example, tables 2.1 and 2.2.

Step 122 may include calculating the weighted similarity values by multiplying similarity values that represent similarities between different parameters of the given potentially compromised asset and the compromised assets by weights. See, for example step 1 and tables 2.1 and 2.2.

Step 122 may include assigning a more significant weight to similarity of indicator of compromise than to an operating system similarity. See, for example, step 1.

The different parameters may include at least two out of an operating system, operating system family, common vulnerability, indicator of compromise and malware instance. See, for example the definition of "similarity".

Step 122 may include calculating a similarity score that is responsive to a number of compromised assets that are deemed to be similar to the given potentially compromised asset. See, for example, step 3.

Step 122 may include calculating the accessibility of the given potentially compromised asset from each one of the original compromised assets and malicious external machines based on a number of ports of the given potentially compromised asset that are accessible to each one of the compromised assets and malicious external machines. See, for example, table 3 and step 4.

Step 120 may be followed by step 130 of generating an alert that is indicative of the compromised assets and of potentially compromised assets that were classified as compromised. See, for example, FIG. 1 and steps 8-9.

The generating of the alert may include sending to a computer of the user an alert, generating an indication about the compromised assets and of potentially compromised assets that were classified as compromised. One or more alerts may provide a summery or one or more compromised assets and/or one or more potentially compromised assets. The alert may represent any portion of the compromised assets and/or or of potentially compromised assets. The portion may include the compromised assets and/or or of potentially compromised assets that may have the highest compromise score. The alert may be included in an alert file. The method may include storing an alert log, an alert depository or any other record that reflects the alerts. The alert may be provided by a man machine interface (screen, speaker), may be a visual alert, an audio alert and the like.

Figure 3:
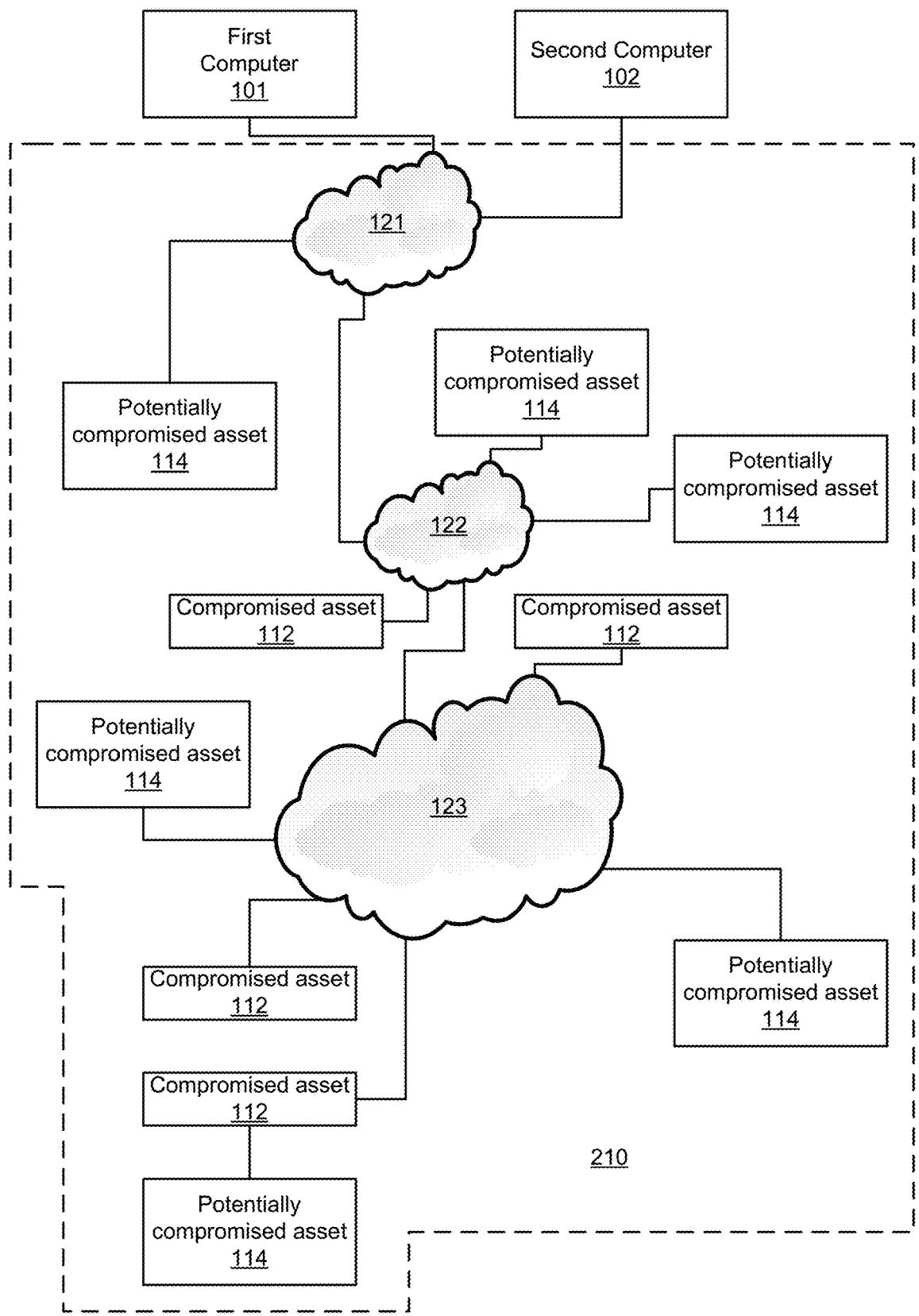
FIG. 3 illustrates a network and multiple computers according to an embodiment of the invention.
Figure 4:
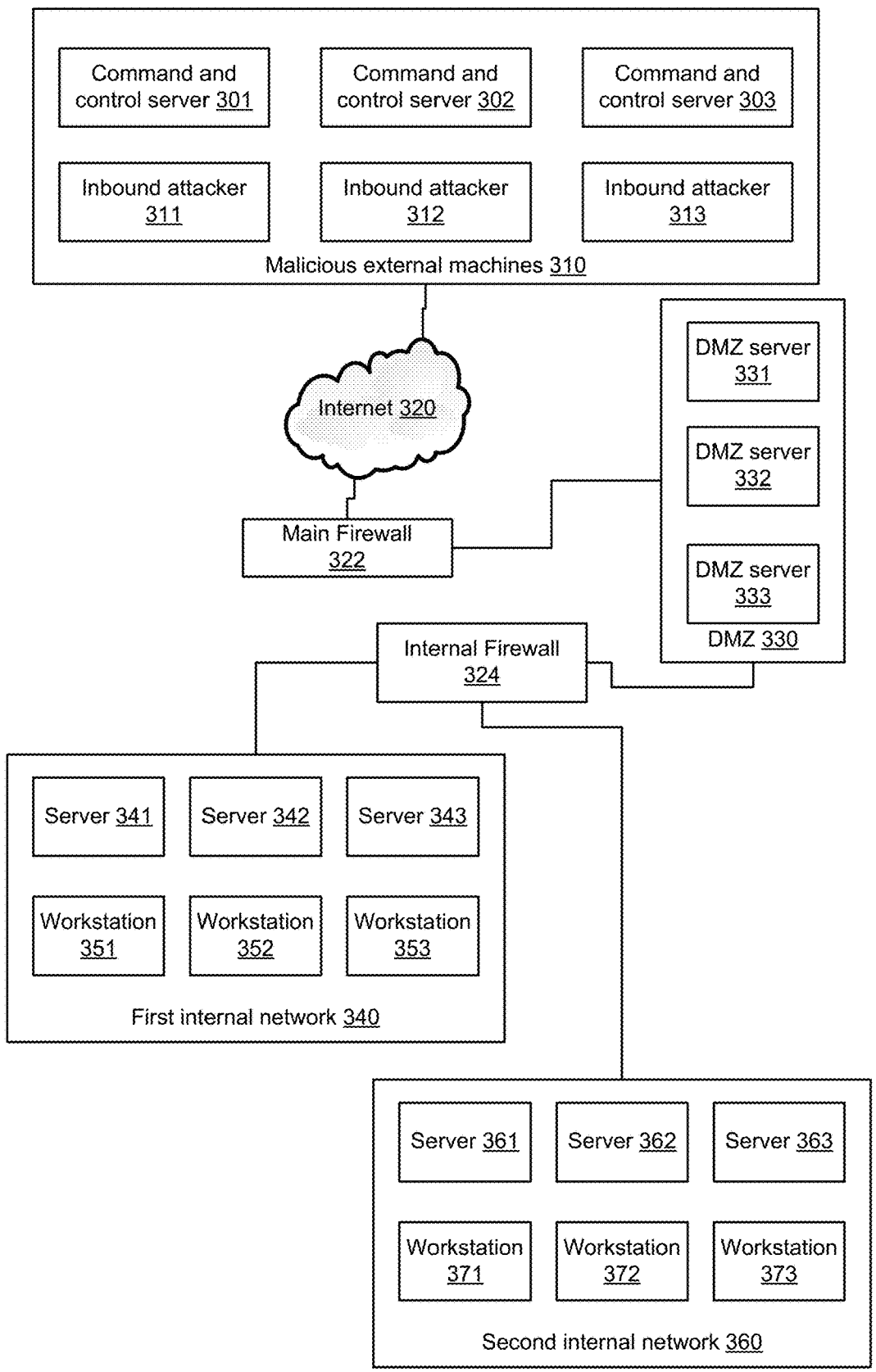
FIG. 4 illustrates a network and multiple computers according to an embodiment of the invention.

FIG. 3 illustrates a first computer 101 that may execute method 10 and/or 100, a second computer 102 that may monitor the traffic between computers and/or may provide other information about the computers of network 210. Network 210 may include multiple networking elements 121, 122 and 123 and multiple computers—some of which are regarded as compromised assets 112 and some are being evaluated—are currently potentially compromised assets 114.

The number of computers of network 210, the type of computers and the connectivity between the computers of the network may vary from monitored network to the other.

Any of the computers 101, 102, 112 and 114 may be servers, laptop computers, desktop computers, mobile computerized systems, media players, mobile phones, tablets, and the like.

FIG. 4-8 illustrate an example of a network that is being scoped. For simplicity of explanation the computer or computers that do the scoping as well as their sensors and not shown. They may be coupled to or otherwise monitor any of the illustrates computerized systems.

Malicious external machines 310 include command and control servers 301, 302 and 303 as well as inbound attackers 311, 312 and 313.

The malicious external machines 310 may be coupled to a network such as the Internet 320.

A main firewall 322 is coupled to the Internet 320 and to the demilitarized zone DMZ 330. DMZ 330 includes DMZ servers 331, 332 and 333.

An internal firewall 324 is coupled to DMZ 330, first internal network 340 and second internal network 360.

First internal network 340 includes servers 341, 342 and 343 as well as workstations 351, 352 and 353.

Second internal network 360 includes servers 361, 362 and 363 as well as workstations 371, 372 and 373.

Figure 5:
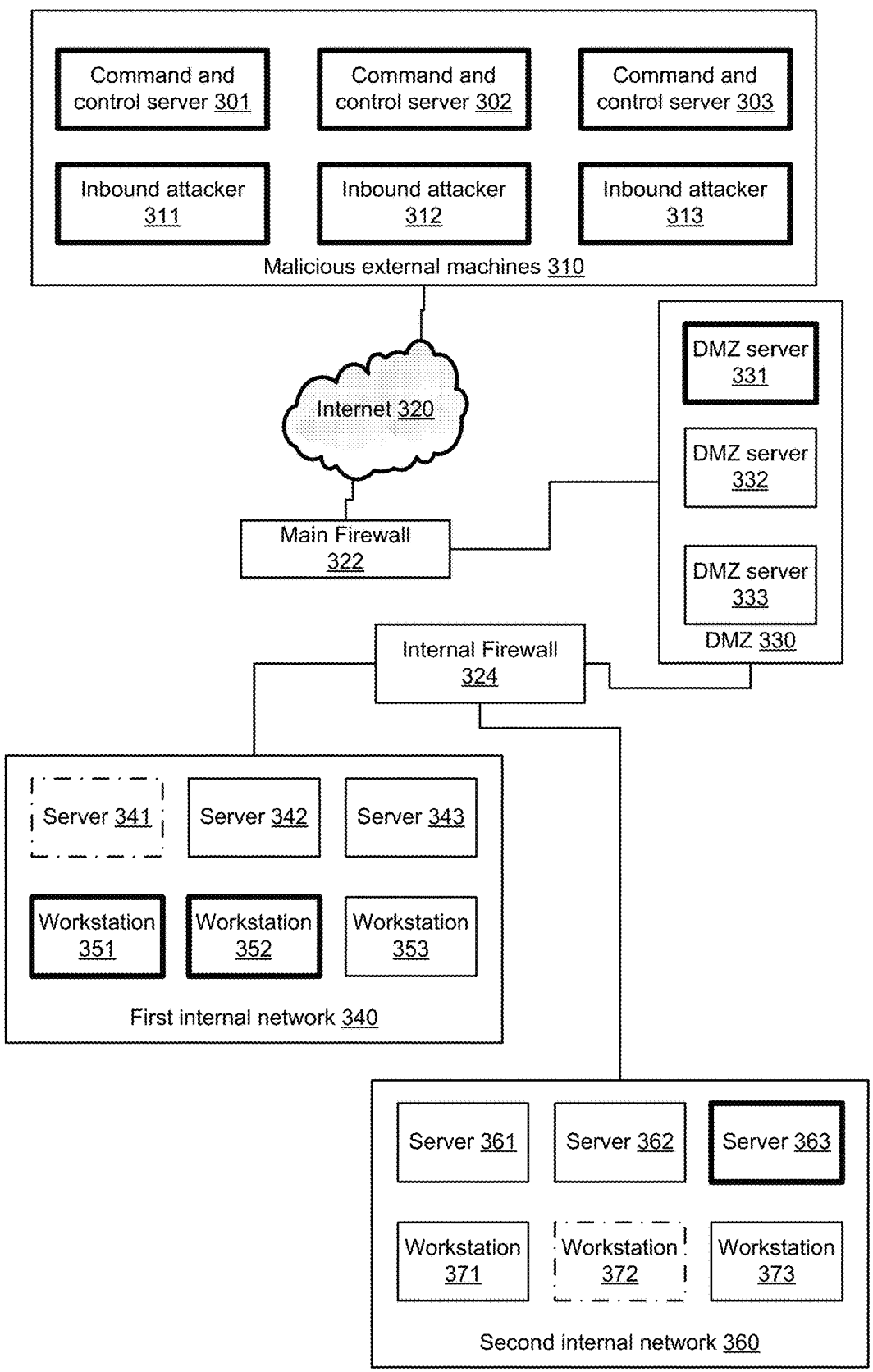
FIG. 5 illustrates a network and multiple computers according to an embodiment of the invention.

FIG. 5 illustrates a scenario in which it is assumed that (a) command and control servers 301, 302 and 303 as well as inbound attackers 311, 312 and 313 are malicious; (b) DMZ server 331, work stations 351 and 352 as well server 363 are compromised assets; and (c) server 341 and workstation 372 are marked as harmless.

Figure 6:
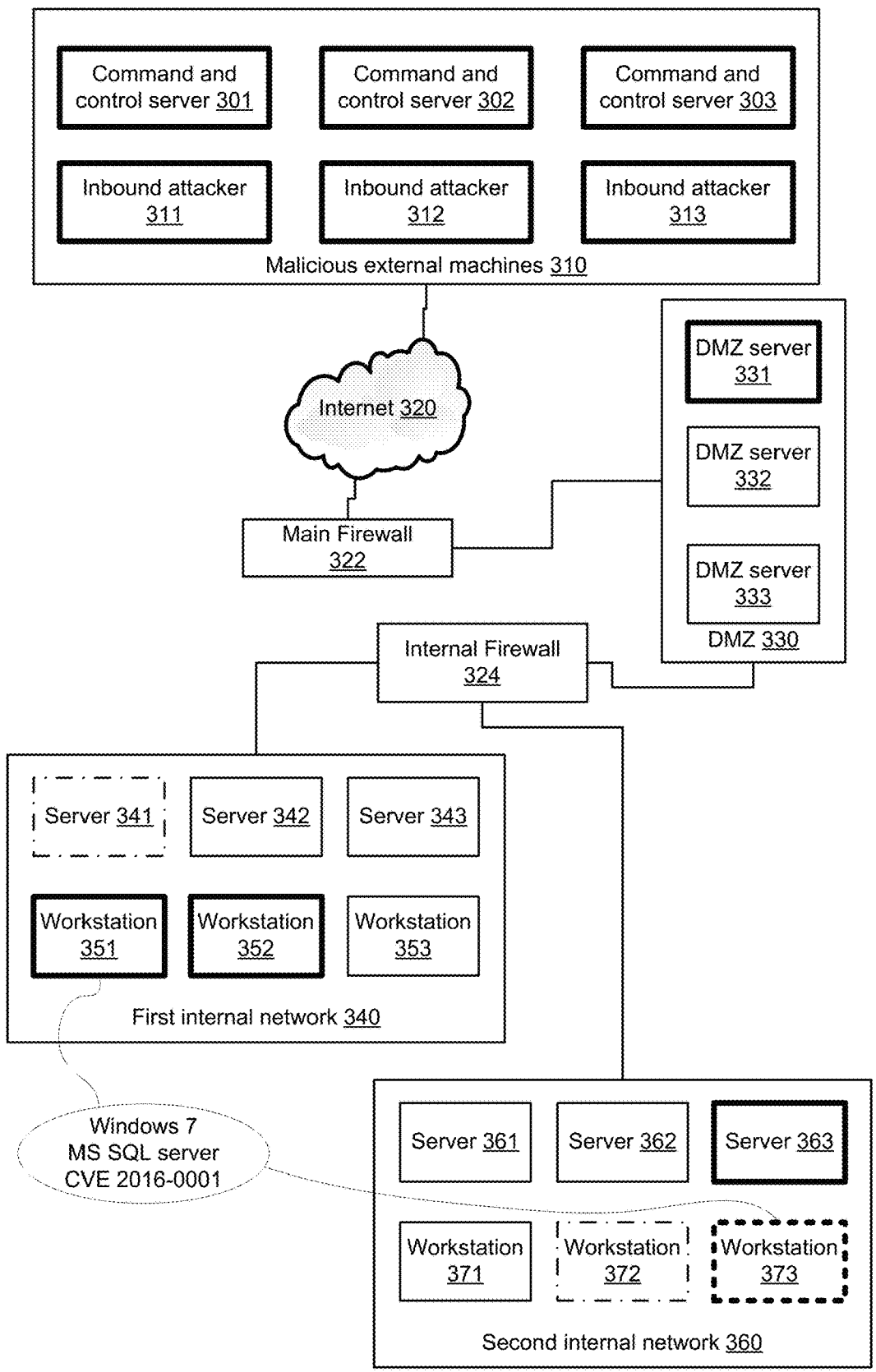
FIG. 6 illustrates a network and multiple computers according to an embodiment of the invention.
Figure 7:
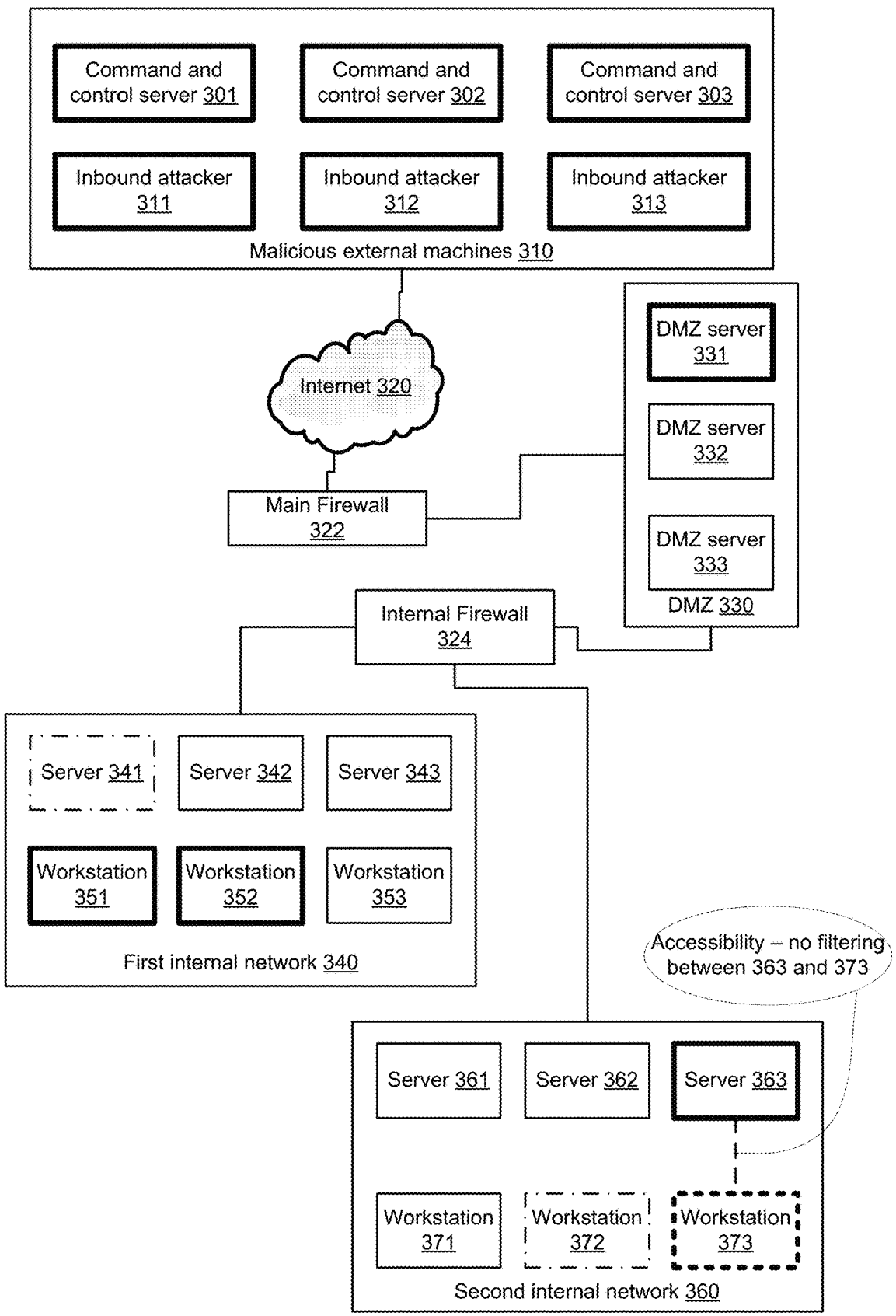
FIG. 7 illustrates a network and multiple computers according to an embodiment of the invention.
Figure 8:
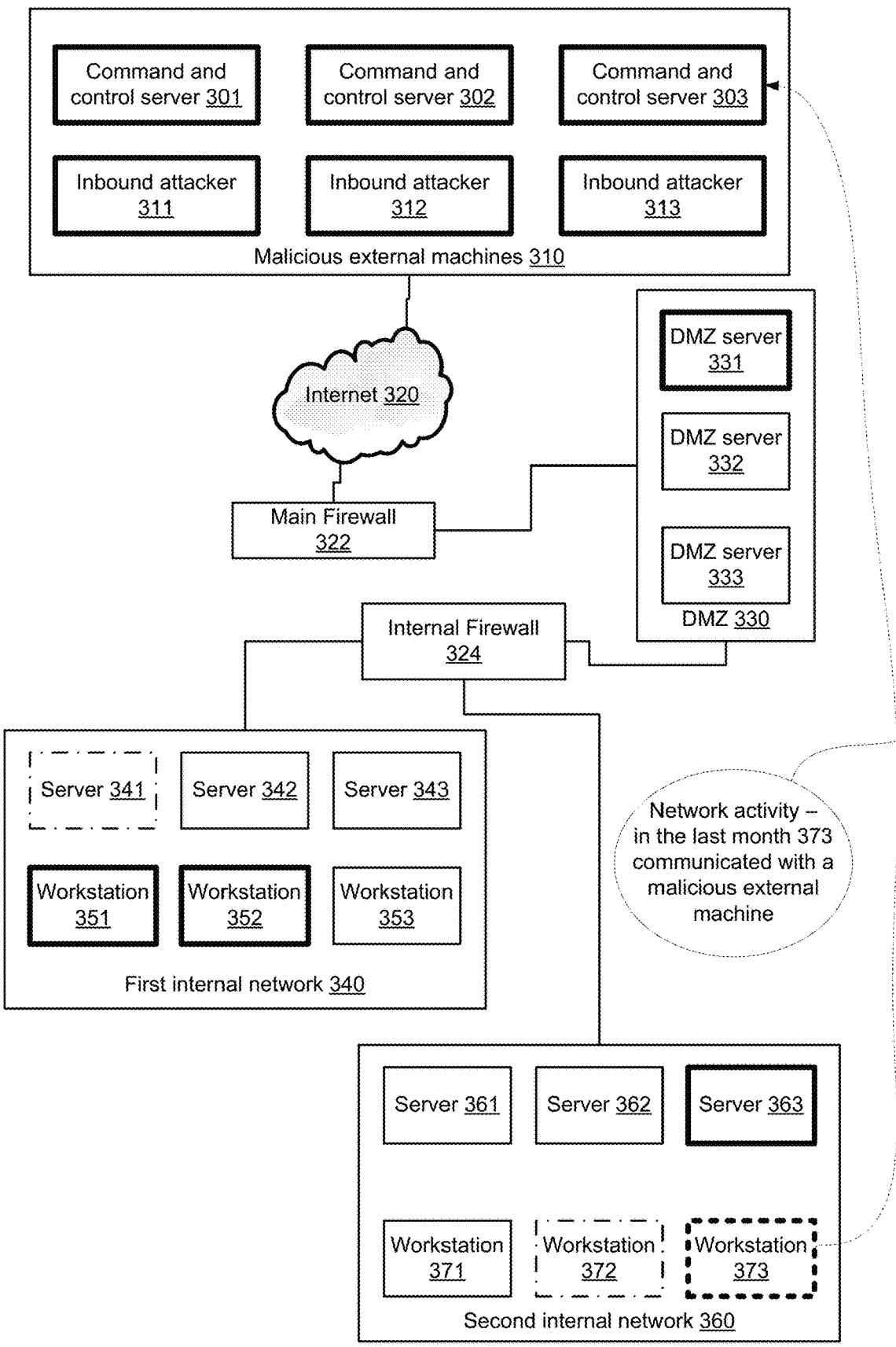
FIG. 8 illustrates a network and multiple computers according to an embodiment of the invention.

FIGS. 6-8 illustrates a classification of workstation 373 based on (a) similarities (FIG. 6) between the given potentially compromised asset and each one of the original compromised assets, (b) a level of accessibility (FIG. 7) from the original compromised assets and malicious external machines to the given potentially compromised assets, and (c) a volume of traffic (inbound/outbound) (FIG. 8) between the given potentially compromised asset and each one of the malicious external machines and original compromised assets.

FIG. 6 illustrates that workstation 373 may be deemed as a suspected compromised asset because it has similar operation system (windows 7), the same SQL server (MS SQL server) and the same vulnerability (CVE 2016-0001) as workstation 351 (which is a compromised asset).

FIG. 7 illustrates that workstation 373 may be deemed as a suspected compromised asset because it may be easily accessed (there is no filtering of access) by server 363 (which is a compromised asset).

FIG. 8 illustrates that workstation 373 may be deemed as a suspected compromised asset because of its volume of traffic with malicious external machines (in the last month 373 communicated with a malicious external machine 303).

The compromise score of workstation 373 may take into account all these factors.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for evaluating a scope of cyber-attack incidents, the method comprises:
    detecting original compromised assets and malicious external machines that are related to each of the cyber-attack incidents; classifying potentially compromised assets to different classes based on (a) similarities between the potentially compromised assets and the original compromised assets, (b) a level of accessibility from the original compromised assets and the malicious external machines to the potentially compromised assets, and (c) volumes of traffic between the potentially compromised assets and each one of the malicious external machines and the original compromised assets; wherein the different classes comprise compromised and non-compromised; and generating an alert that is indicative of the original compromised assets and of potentially compromised assets that were classified as compromised.

2. The method according to claim 1 wherein the different classes comprise a suspected asset that warrants further analysis.

3. The method according to claim 1 wherein the classifying of the potentially compromised assets comprises assigning a compromise score to each potentially compromised asset, wherein a compromise score of a given potentially compromised asset is responsive to (a) similarities between the given potentially compromised asset and each one of the original compromised assets, (b) a level of accessibility from the original compromised assets and the malicious external machines to the given potentially compromised assets, and (c) a volume of traffic between the given potentially compromised asset and each one of the malicious external machines and the original compromised assets.

4. The method according to claim 3 wherein a calculating of the compromise score of the given potentially compromised asset comprises calculating a similarity score that is based on weighted similarity values.

5. The method according to claim 4 wherein the calculating of the compromise score of the given potentially compromised asset is further based on upper bounds of the weighted similarity values.

6. The method according to claim 4 comprising calculating the weighted similarity values by multiplying similarity values that represent similarities between different parameters of the given potentially compromised asset and the original compromised assets by weights.

7. The method according to claim 6 comprising assigning a more significant weight to similarity of indicator of compromise than to an operating system similarity.

8. The method according to claim 6 wherein the different parameters comprises at least two out of an operating system, an operating system family, a common vulnerability, an indicator of compromise and malware instance.

9. The method according to claim 6 wherein the different parameters comprises an operating system, an operating system family, a common vulnerability, an indicator of compromise and malware instance.

10. The method according to claim 3 wherein a calculating of the compromise score of the given potentially compromised asset comprises calculating a similarity score that is responsive to a number of original compromised assets that are deemed to be similar to the given potentially compromised asset.

11. The method according to claim 3 comprising calculating the accessibility of the given potentially compromised asset from each one of the original compromised assets and the malicious external machines based on a number of ports of the given potentially compromised asset that are accessible to each one of the original compromised assets and the malicious external machines.

12. The method according to claim 3 comprising classifying each potentially compromised asset to different classes that comprises compromised, non-compromised and a suspected asset that warrants further analysis based on the compromise score of each potentially compromised asset.

13. A non-transitory computer readable medium that stores instructions that once executed by a computer causes the computer to evaluate a scope of cyber-attack incidents, by:

detecting original compromised assets and malicious external machines that are related to each of the cyber-attack incidents;

classifying potentially compromised assets to different classes based on (a) similarities between the potentially compromised assets and the original compromised assets, (b) a level of accessibility from the original compromised assets and the malicious external machines to the potentially compromised assets, and (c) volumes of traffic between the potentially compromised assets and each one of the malicious external machines and the original compromised assets; wherein the different classes comprise compromised and non-compromised; and generating an alert that is indicative of the original compromised assets and of potentially compromised assets that were classified as compromised.

14. The non-transitory computer readable medium according to claim 13 wherein the different classes comprise a suspected asset that warrants further analysis.

15. The non-transitory computer readable medium according to claim 13 wherein the classifying of the potentially compromised assets comprises assigning a compromise score to each potentially compromised asset, wherein a compromise score of a given potentially compromised asset is responsive to (a) similarities between the given potentially compromised asset and each one of the original compromised assets, (b) a level of accessibility from the original compromised assets and the malicious external machines to the given potentially compromised assets, and (c) a volume of traffic between the given potentially compromised asset and each one of the malicious external machines and the original compromised assets.

16. The non-transitory computer readable medium according to claim 15 wherein a calculating of the compromise score of the given potentially compromised asset comprises calculating a similarity score that is based on weighted similarity values.

17. The non-transitory computer readable medium according to claim 16 wherein the calculating of the compromise score of the given potentially compromised asset is further based on upper bounds of the weighted similarity values.

18. The non-transitory computer readable medium according to claim 16 that stores instructions for calculating the weighted similarity values by multiplying similarity values that represent similarities between different parameters of the given potentially compromised asset and the original compromised assets by weights.

19. The non-transitory computer readable medium according to claim 18 that stores instructions for assigning a more significant weight to similarity of indicator of compromise than to an operating system similarity.

20. The non-transitory computer readable medium according to claim 18 wherein the different parameters comprises at least two out of an operating system, an operating system family, a common vulnerability, an indicator of compromise and malware instance.

21. The non-transitory computer readable medium according to claim 18 wherein the different parameters comprises an operating system, an operating system family, a common vulnerability, an indicator of compromise and malware instance.

22. The non-transitory computer readable medium according to claim 15 wherein a calculating of the compromise score of the given potentially compromised asset comprises calculating a similarity score that is responsive to a number of original compromised assets that are deemed to be similar to the given potentially compromised asset.

23. The non-transitory computer readable medium according to claim 15 that stores instructions for calculating the accessibility of the given potentially compromised asset from each one of the original compromised assets and the malicious external machines based on a number of ports of the given potentially compromised asset that are accessible to each one of the original compromised assets and the malicious external machines.

24. The non-transitory computer readable medium according to claim 15 that stores instructions for classifying each potentially compromised asset to different classes that comprises compromised, non-compromised and a suspected asset that warrants further analysis based on the compromise score of each potentially compromised asset.

\* \* \* \* \*